Feb. 9, 1943.   L. G. SWANSON   2,310,881
METHOD FOR DRESSING POULTRY
Original Filed Dec. 29, 1937
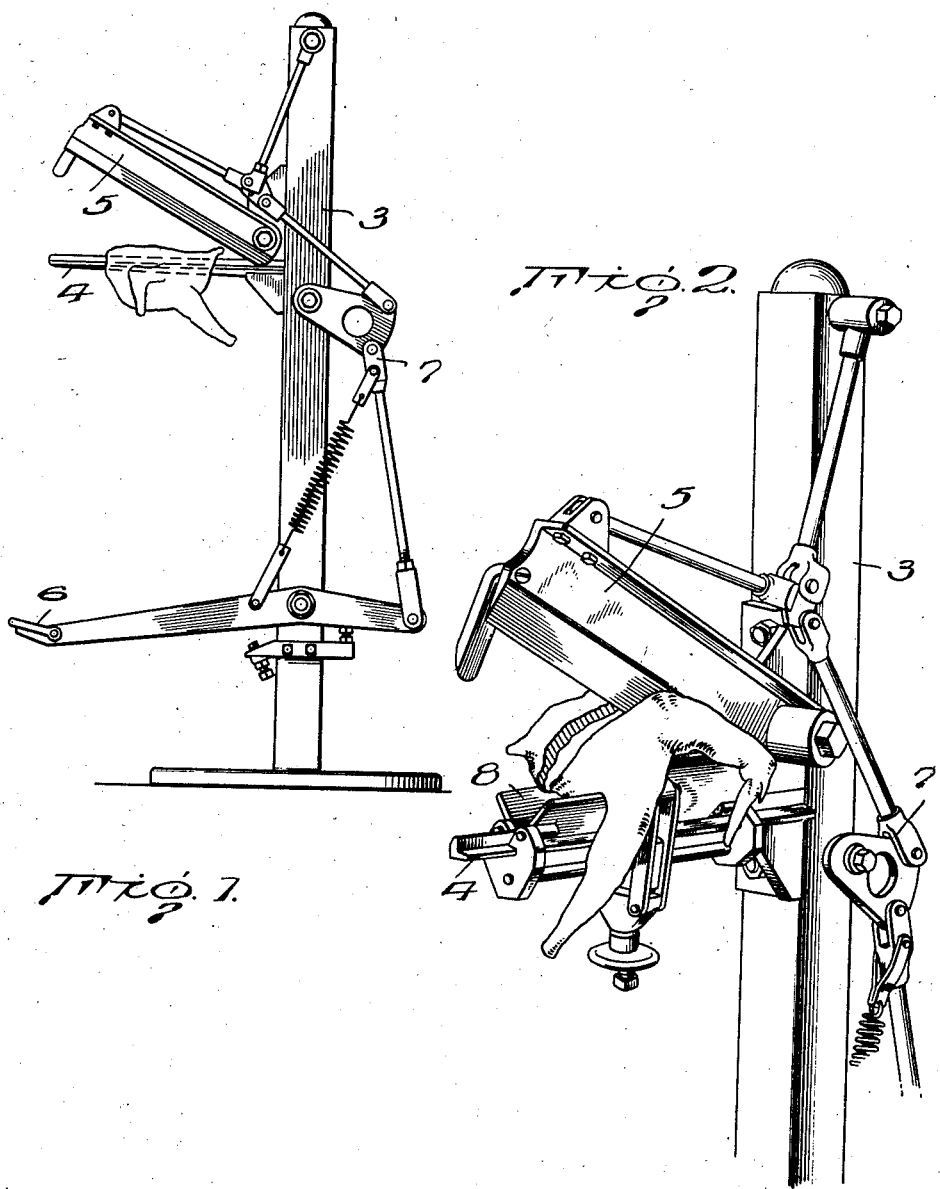
Inventor
Levi G. Swanson,
By Bernard F. Gawley
Attorney Patented Feb. 9, 1943

2,310,881

UNITED STATES PATENT OFFICE 2,310,881

METHOD FOR DRESSING POULTRY

Levi George Swanson, Perry, Iowa

Original application December 29, 1937, Serial No. 183,284. Divided and this application March 22, 1939, Serial No. 263,536

2 Claims. (Cl. 17—45)

The present invention consists of a method of dressing and dissecting fowl, this being a division of my co-pending application filed December 29, 1937, Serial No. 183,284, which has issued as Patent No. 2,237,203, dated April 1, 1941.

Objects of this invention are to provide a method whereby fowl may be opened for inspection, before or after removal of the head and feet, without puncturing or incising the viscera; to open the fowl in such a manner that evisceration may be effected with little effort, yet in a manner which insures positive and complete evisceration in a minimum period of time; to provide a method wherein the incision may be conveniently closed, after evisceration or, if desired, the fowl may be halved, quartered or completely dissected at the option of the user; and to provide a method which is expeditious, even when employed by a person unskilled in the art to which the invention relates.

To those skilled in the art, other objects will suggest themselves from the following description of the present preferred form of the invention, wherein Fig. 1 is a side elevational view of a form of machine employed for carrying out the method of the present invention, and Fig. 2 is a fragmentary perspective view of the same machine.

The form of apparatus illustrated in the drawing, which may be employed in practicing the method of the present invention, consists of a supporting standard 3, upon which is mounted a fowl supporting bar or blade 4. The standard is also equipped with suitable means for slitting, incising, or dissecting the poultry consisting of a blade 5 which may be pivotally mounted in any suitable manner on the standard 3. The blade may be foot operated through the instrumentality of a pedal 6, the latter being operatively connected to the blade 5 by suitable mechanism, generally designated 7.

It is also preferred, in carrying out the steps of this method, to employ a fowl supporting trough 8 which is detachably mounted on the supporting bar 4 in the path of operation of the blade 5, as illustrated to advantage in Fig. 2.

In practicing the method of my invention, it is preferred that the fowl be threaded in a horizontal position on the supporting bar or blade, such as illustrated in the drawing at 4, the bar passing through an incision adjacent the vent at one end of the fowl, and also through an incision above the crop at the opposite end of the fowl. In this way the bar may be threaded on a line parallel with the backbone of the fowl, permitting the viscera to gravitate toward the breast. While in this position a cutting element may be urged through the vertebrae or backbone of the fowl and against the bar or blade supporting the latter. When the machine, shown in the drawing, is employed to carry out the method of my invention, after the fowl has been threaded on the bar 4, the foot pedal 6 is depressed which urges the blade 5 through the backbone of the fowl and into engagement with the bar of blade 4. It is preferable that the bar which supports the fowl include a cutting edge so as to augment the cutting action of the blade 5. In other words, in employing the method of the present invention, it is preferred to use two blades, one of which works from the inside, the other from the outside, to not only expedite slitting of the fowl, but likewise to effect a shearing cut and eliminate the possibility of mashing or fragmenting the vertebrae structure of the fowl.

When the fowl has been slit through the back, as above set out, it is manifest that it may then be opened up along the line of the incision and completely eviscerated with facility. Following evisceration the incision may be closed by sewing, skewing or otherwise, so that the fowl, in its entirety, is available for shipping or transportation and ultimately to be baked, boiled or otherwise prepared, in its entirety.

The method further contemplates the bisecting, quartering and dissecting the fowl pursuant to evisceration. First, in bisecting or halving the fowl, after evisceration, instead of closing the incision, the fowl is mounted on a suitable support and secured from lateral displacement so that the incision may be continued completely through the fowl. I have found that for this purpose a trough, as illustrated at 8, in Fig. 2 of the drawing, may be used to advantage. With this apparatus, after the fowl has been slit through the back and eviscerated, the trough is slidably mounted on the bar or rod 4 and the fowl mounted breast down in the trough. Following this the blade 5 is again actuated so that it may be urged between the sides of the trough to cut through the breast of the fowl to thereby consummate bisection.

Further dissection of the fowl, such for instance, by removal of the legs and wings, may be accomplished by bringing together the blades 4 and 5, in an apparent manner, at the desired points where the fowl is to be severed.

It is preferred, in employing the present method, that in all operations where the fowl is opened or dissected, the method contemplates the use of cutting means on both sides of the fowl in the line of cleavage. This, as already stated, in connection with slitting of the fowl through the back, is to prevent mashing or tearing either the meat or bone structure of the fowl, and likewise to eliminate cracking or fragmenting of the bone.

It is to be understood that various changes may be made within the scope of the claims hereto appended.

What is claimed is:

1. The method of dressing and bisecting fowl consisting in suspending the fowl in a position to space the viscera from the back of the fowl, incising the fowl through the back, without contact with the viscera, permitting the viscera to be removed intact, and incising the fowl through the breast, after evisceration, to bisect the fowl.

2. A method of dressing and dissecting fowl consisting in incising the fowl through the backbone, eviscerating the fowl, securing the fowl from displacement with the breast down, and incising the fowl completely through the breast to bisect the latter.

LEVI GEORGE SWANSON.